United States Patent
Spinelli

(10) Patent No.: US 6,180,690 B1
(45) Date of Patent: Jan. 30, 2001

(54) ALKOXYSILANE BINDERS AS ADDITIVES IN INK JET INKS

(75) Inventor: Joseph Harry Spinelli, Wilmington, DE (US)

(73) Assignee: E. I. du Pont de Nemours and Company, Wilmington, DE (US)

(*) Notice: Under 35 U.S.C. 154(b), the term of this patent shall be extended for 0 days.

(21) Appl. No.: 09/186,230

(22) Filed: Nov. 4, 1998

(51) Int. Cl.[7] .............................. C09D 11/10; C08L 83/06; C08F 283/12

(52) U.S. Cl. .................. 523/160; 524/506; 524/858; 525/100; 525/479

(58) Field of Search ................................ 523/160, 161; 106/31.6, 31.32; 524/505, 506, 858; 525/100, 474, 479

(56) References Cited

U.S. PATENT DOCUMENTS

| | | | |
|---|---|---|---|
| 4,045,397 | | 8/1977 | Parkinson .......................... 260/29.3 |
| 5,079,312 | * | 1/1992 | Isozaki et al. ........................ 525/479 |
| 5,085,698 | | 2/1992 | Ma et al. ................................ 106/20 |
| 5,124,212 | | 6/1992 | Lee et al. .............................. 428/429 |
| 5,204,404 | * | 4/1993 | Werner, Jr. et al. .................. 524/501 |
| 5,219,945 | * | 6/1993 | Dicker et al. ......................... 525/276 |
| 5,356,996 | * | 10/1994 | Nakao et al. ......................... 525/158 |
| 5,443,628 | * | 8/1995 | Loria et al. ......................... 106/31.65 |
| 5,449,717 | * | 9/1995 | Yokoyama et al. ................... 525/160 |
| 5,519,085 | | 5/1996 | Ma et al. .............................. 524/503 |
| 5,602,204 | * | 2/1997 | Harimoto et al. .................... 525/209 |
| 5,712,340 | * | 1/1998 | Gyotoku et al. ...................... 524/521 |
| 5,821,283 | * | 10/1998 | Hesler et al. ......................... 523/161 |
| 5,840,806 | * | 11/1998 | Komozaki et al. ................... 525/101 |
| 5,854,308 | * | 12/1998 | Kuo et al. ............................. 523/161 |
| 5,889,083 | * | 3/1999 | Zhu ....................................... 523/161 |
| 5,905,109 | * | 5/1999 | Shimizu et al. ...................... 524/506 |
| 5,912,052 | * | 6/1999 | Kuwano et al. ...................... 427/258 |
| 5,912,280 | * | 6/1999 | Anton et al. .......................... 523/161 |
| 5,962,552 | * | 10/1999 | Mikami et al. ....................... 523/161 |
| 5,962,609 | * | 10/1999 | Hadleton et al. ..................... 526/131 |

FOREIGN PATENT DOCUMENTS

| | | |
|---|---|---|
| 0 071 345 | 2/1983 | (EP) . |
| 0 466 345 | 1/1992 | (EP) . |
| 2 088 402 | 6/1982 | (GB) . |
| 62-225577 | 10/1987 | (JP) . |
| 62-231787 | 10/1987 | (JP) . |
| 63-109083 | 5/1988 | (JP) . |
| 63-235382 | 9/1988 | (JP) . |
| 3-258867 | 11/1991 | (JP) . |
| 5-186725 | 7/1993 | (JP) . |
| 5-64667 | 9/1993 | (JP) . |
| 08290105 * | 11/1996 | (JP) . |
| WO 97/31984 | 9/1997 | (WO) . |

OTHER PUBLICATIONS

Sperling, L.H.; "Introduction to Physical Polymer Chemistry", John Wiley and Sons, New York (pp. 7 and 78), 1992.*
English Translation of JP08290105, 1996.*

* cited by examiner

*Primary Examiner*—Vasu Jagannathan
*Assistant Examiner*—Callie E. Shosho
(74) *Attorney, Agent, or Firm*—Joseph A. Tessari

(57) ABSTRACT

Aqueous ink jet ink compositions comprising an aqueous vehicle, a colorant, and an alkoxysilane binder additive, have excellent water and smear fastness and print quality.

11 Claims, No Drawings

ALKOXYSILANE BINDERS AS ADDITIVES IN INK JET INKS

BACKGROUND OF THE INVENTION

This invention relates to aqueous inks for ink jet printers, and, more particularly, to aqueous inks containing an alkoxysilane binder additive.

Ink jet printing is a non-impact printing process in which droplets of ink are deposited on a substrate such as paper or transparency film in response to an electronic signal. Low cost and high quality of the output, combined with relatively noise free operation, have made ink jet printers a popular option to other types of printers used with computers.

Both dyes and pigments have been used as ink colorants for ink jet printers. The dye-based inks while in general superior in color properties have several disadvantages as compared to pigment based inks. The dyes are usually water soluble and remain so after drying on the substrate. They are easily redissolved by water spills, and the image smears on contact with felt pen markers. In addition, the dyes exhibit poor light stability relative to pigments and are known to fade even under office lighting. Thus, dye-based inks are often unsuitable for use in applications requiring moisture resistance and greater light stability. The pigments are preferred colorants provided the pigment dispersion can be made resistant to flocculation and settling.

Water-based pigment dispersions are well known in the art, and have been used commercially for applying films, such as paints, to various substrates. The pigment dispersion is generally stabilized by either a non-ionic or ionic technique. When using the non-ionic technique, the pigment particles are stabilized by a polymer that has a water-soluble, hydrophilic section that extends into the water and provides entropic or steric stabilization. Representative polymers useful for this purpose include polyvinyl alcohol, cellulosics, ethylene oxide modified phenols, and ethylene oxide/propylene oxide polymers. While the non-ionic technique is not sensitive to pH changes or ionic contamination, it has a major disadvantage for many applications in that the final product is water sensitive. Thus, if used in ink applications or the like, the ink will tend to smear upon exposure to moisture.

There exists a need for ink jet inks which have good water and smear fastness. In particular, with pigment based inks there is a need to maintain the stability of the dispersion while improving water and smear fastness.

SUMMARY OF THE INVENTION

In accordance with this invention, there is provided an aqueous ink jet ink composition comprising:

(A) an aqueous vehicle;

(B) a colorant; and (C) an additive selected from the group consisting of alkoxysilane binder additive.

The compositions have excellent water and smear fastness, print quality and they have excellent dispersion stability.

DETAILED DESCRIPTION OF THE INVENTION

The ink compositions of this invention comprise an aqueous vehicle, a colorant (i.e., a dye or pigment) and an alkoxysilane binder additive. The inks may also contain other additives as is known in the art.

Aqueous Vehicle

The aqueous vehicle is water, or a mixture of water and at least one water soluble organic solvent. Deionized water is commonly used. Selection of a suitable mixture of water and water soluble organic solvent depends upon requirements of the specific application, such as desired surface tension and viscosity, the selected colorant and the drying time of the ink. Water-soluble organic solvents are well known, representative examples of which are disclosed in U.S. Pat. No. 5,085,698, the disclosure of which is incorporated herein by reference. A mixture of a water soluble organic solvent having at least 2 hydroxyl groups, e.g, diethylene glycol, and deionized water is preferred as the aqueous vehicle. In the event that a mixture of water and organic solvent is used as the aqueous vehicle, water would comprise between 25% and 99%, preferably 45% to 95%, by weight of the aqueous medium, based on the total combined weight of the aqueous vehicle.

Colorants

The colorants useful in the present invention may be a pigment or a dye. A pigment is a colorant that is remains in a crystalline or particulate state throughout the printing process. A dye is a colorant that is soluble at some point in the printing process, even if it is insoluble in the aqueous vehicle at room temperature. If a pigment is used as the colorant, which is preferred, a dispersing agent, preferably a polymeric dispersant, will also be used.

Pigments:

Useful pigments for the dispersion comprise a wide variety of organic and inorganic pigments, alone or in combination. The pigment particles are sufficiently small to permit free flow of the ink through the ink jet printing device, especially at the ejecting nozzles. Small particles are also desirable for dispersion stability and maximum color strength. The range of useful particle size is approximately 0.005 micron to 15 micron. Preferably, the pigment particle size should range from 0.005 to 5 micron and most preferably, from 0.01 to 0.3 micron. Representative commercial dry and presscake pigments that may be used in practicing the invention, including metals and metal oxides, are disclosed in the aforementioned U.S. Pat. No. 5,085,698, which is incorporated herein by reference.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravity than organic pigments.

Polymeric dispersants are the preferred dispersants for pigments. Polymeric dispersants suitable for practicing the invention include random polymers and block polymers and graft polymers. Because random polymers are not as effective in stabilizing pigment dispersions as the block copolymers, they are not preferred. Suitable block polymer dispersants and the synthesis thereof are disclosed in the aforementioned U.S. Pat. No. 5,085,698 and in U.S. Pat. No. 5,519,085, the disclosures of which are incorporated herein by reference In addition to, or in place of the polymeric dispersant compounds, surfactant compounds may be used as dispersants as is well known in the art.

Dyes:

Dyes useful in this invention include anionic, cationic, amphoteric and non-ionic dyes. Such dyes are well known to those of ordinary skill in the art. Anionic dyes are those dyes which in aqueous solution yield colored anions and cationic dyes are those which in aqueous solution yield colored cations.

Typically anionic dyes contain carboxylic or sulfonic acid groups as the ionic moiety. The types of anionic dyes most useful in this invention are for example Acid, Direct, Food, Mordant, and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

Cationic dyes usually contain quaternary nitrogen groups. The types of cationic dyes that are most useful in this invention include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known to those skilled in the art.

The color and amount of dye used in the ink composition is largely a function of choice, being primarily dependent upon the desired color of the print achieved with the ink, the purity of the dye and its strength. The dye is typically present in the amount of 0.01 to 20%, by weight, preferably 0.05 to 8%, more preferably 1 to 5%, based on the total weight of the ink.

Alkoxysilane Binder Additive

The alkoxysilane binder additives useful in this invention have a number average molecular weight of 500 to 25,000, preferably 2,000 to 12,000, and most preferably 4,000 to 10,000. Suitable alkoxysilanes useful in preparing the binder additives are represented by the formula:

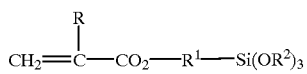

where R=H, methyl or ethyl; $R^1$=alkyl, aryl, or alkyaryl, preferably an aliphatic group containing 3 carbons; and $R^2$=alkyl, aryl or alkylaryl, preferably an aliphatic group containing up to 5 carbons.

The alkoxysilane polymer binders can be random, block, graft or branched polymers also contain other monomers such as acrylic and methacrylic monomers, vinyl monomers styrene monomers, etc. The binders may also contain acid, amine, anhydride or other functional groups.

Some useful alkoxysilane binder additives are 3-(trimethoxy)silylpropyl methacrylate/Benzyl methacrylate/Dimethylaminoethyl methacrylate (5/10/5), 3-(trimethoxy)silylpropyl methacrylate/Benzyl methacrylate/Dimethylaminoethyl methacrylate (10/10/10), 3-(trimethoxy)silylpropyl methacrylate/Benzyl methacrylate/Dimethylaminoethyl methacrylate (10/10/5), 3-(trimethoxy)silyl-propyl methacrylate/Benzyl methacrylate/Methacrylic acid (10/10/5), and 3-(trimethoxy)silylpropyl methacrylate/Benzyl methacrylate/Methacrylic acid (5/10/5).

The alkoxysilane binder additives are present in the amount of 0.1 to 25.0% by weight, preferably 0.5 to 5.0% by weight, based on the total weight of the ink composition.

Other Ingredients

The ink may contain other ingredients. For example, the surfactants may be used to alter surface tension as well as maximize penetration. However, they may also destabilize the pigment dispersion for pigmented inks. The choice of a specific surfactant is also highly dependent on the type of media substrate to be printed. It is expected that one skilled in the art can select the appropriate surfactant for the specific substrate to be used in printing. In aqueous inks, the surfactants may be present in the amount of 0.01–5% and preferably 0.2–2%, based on the total weight of the ink.

Biocides may be used in the ink compositions to inhibit growth of micro-organisms. Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.) and sodium benzoate are examples of such biocides.

In addition, sequestering agents such as EDTA may also be included to eliminate deleterious effects of heavy metal impurities.

Other known additives, such as humectants, viscosity modifiers and other acrylic or non-acrylic polymers made also be added to improve various properties of the ink compositions.

Ink Preparation

The ink compositions of the present invention are prepared in the same manner as other ink jet ink compositions. If a pigment dispersion is used as the colorant, the dispersion is prepared by premixing the selected pigment(s) and dispersant in water. The dispersion step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous vehicle. The cosolvents may be present during the dispersion step.

If a dye is used as the colorant, there is no dispersant present and no need for pigment deaggregation. The dye-based ink is prepared in a well agitated vessel rather than in dispersing equipment.

It is generally desirable to make the ink jet inks in concentrated form, which is subsequently diluted with a suitable liquid to the appropriate concentration for use in the ink jet printing system. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Ink jet inks suitable for use with ink jet printing systems should have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cP to about 10.0 cP at 20° C. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus. Fixing the ink on the media substrate, such as, paper, fabric, film, etc., can be carried out rapidly and accurately.

The printed ink images have clear color tones, high density, excellent water resistance and lightfastness. Furthermore, the ink does not corrode parts of the ink jet printing device it comes in contact with, and it is essentially odorless.

EXAMPLES

The following examples further illustrate the invention. The parts and percentages are by weight unless otherwise noted.

The binder additives are prepared using the following procedures:

Binder Additive 1:

This shows the preparation of an alkoxysilane containing polymer, 3-(trimethoxy)silylpropyl methacrylate-co-benzyl methacrylate-co-dimethylaminoethyl methacrylate (10/10/10).

A 3-liter flask was equipped with a mechanical stirrer, thermometer, N2 inlet, drying tube outlet, and addition funnels. Tetrahydrofuran THF, 914 gms, and mesitylene, 5.0 gms, were charged to the flask. The catalyst tetrabutyl ammonium m-chlorobenzoate, 0.8 ml of a 1.0 M solution in acetonitrile, was then added. Initiator, 1-methoxy-trimethylsiloxy propene, 26.0 gms (0.15 M) was injected. Feed I [tetrabutyl ammonium m-chlorobenzoate, 0.8 ml of a 1.0 M solution in acetonitrile] was started and added over 150 minutes. Feed II was composed of 3-(trimethoxy) silylpropyl methacrylate [Z-6030 from Dow Corning] 371.0 gms (1.50 M), benzyl methacrylate, 265.5 (1.50 M), and dimethylaminoethyl methacrylate, 236.1 gms (1.50 M). It was started at 0.0 minutes and added over 30 minutes. Fifty minutes after Feed I was completed 160.7 gms of dry methanol were added to the above solution and distillation begun. During the first stage of distillation, 138.4 gms of material were removed from the flask. Dry methanol, 200.0 gms, was added and the distillation continued until another 156.0 gms of solvent were removed. A total of 338.4 gms of solvent were removed. This made a Z-6030/BZMA/DMAEMA 10/10/10 (43/30/27 weight %) polymer at 46.2% solids with a Mn=5,800.

An aqueous solution of this polymer was made by mixing 108.0 gms of polymer, 8.5 gms of phosphoric acid, and 383.0 gms of water. This made a 10% polymer solution.

Binder Additive 2:

The above procedure was repeated with the following exceptions: 117.7 gms of dimethylaminoethyl methacrylate were used in Feed II. This made a Z-6030/BZMA/DMAEMA 10/10/5 (50/35/15 weight %) polymer at 40.6% solids with a Mn=5,000

An aqueous solution of this polymer was made by mixing 123.0 gms of polymer, 4.9 gms of phosphoric acid, and 372.0 gms of water. This made a 10% polymer solution.

Binder Additive 3:

The above procedure was repeated with the following exceptions: 118.0 gms of dimethylaminoethyl methacrylate and 186.6 gms of 3-(trimethoxy)silylpropyl methacrylate were used in Feed II. This made a Z-6030/BZMA/DMAEMA 5/10/5 (33/47/20 weight %) polymer at 40.4% solids with a Mn=3,800.

An aqueous solution of this polymer was made by mixing 124.0 gms of polymer, 6.4 gms of phosphoric acid, and 370.0 gms of water. This made a 10% polymer solution.

Binder Additive 4:

This shows the preparation of an alkoxysilane containing polymer, Z-6030/BZMA/MAA 10/10/10.

A 3-liter flask was equipped with a mechanical stirrer, thermometer, N2 inlet, drying tube outlet, and addition funnels. Tetrahydrofuran THF, 947 gms, and mesitylene, 5.0 gms, were charged to the flask. The catalyst tetrabutyl ammonium m-chlorobenzoate, 0.8 ml of a 1.0 M solution in acetonitrile, was then added. Initiator, 1,1-bis (trimethylsiloxy)-2-methyl propene, 34.6 gms (0.15 M) was injected. Feed I [tetrabutyl ammonium m-chlorobenzoate, 0.8 ml of a 1.0 M solution in acetonitrile] was started and added over 210 minutes. Feed II was composed of 3-(trimethoxy)silylpropyl methacrylate [Z-6030 from Dow Corning], 370.0 gms (1.50 M), benzyl methacrylate, 262.2 (1.50 M), and trimethylsilyl methacrylate, 235.8 (1.50 M). It was started at 0.0 minutes and added over 30 minutes. Fifty minutes after Feed I was completed, 163.2 gms of dry methanol were added to the above solution and distillation begun. During the first stage of distillation, 252.9 gms of material were removed from the flask. Dry methanol, 202.0 gms, was added and the distillation continued until another 269.0 gms of solvent were removed. A total of 521.8 gms of solvent were removed. This made a Z-6030/BZMA/MAA 10/10/10 (49/34/17 weight %) polymer at 44.7% solids with a Mn=5,100.

An aqueous solution of this polymer was made by mixing 112.0 gms of polymer, 11.9 gms of 45% potassium hydroxide, and 376.0 gms of water. This made a 10% polymer solution.

Binder Additive 5:

The procedure for Binder Additive 4 was repeated with the following exceptions: 117.7 gms of trimethylsilyl methacrylate were used in Feed II. This made a Z-6030/BZMA/MAA 10/10/5 (53/3819 weight %) polymer at 44.2% solids with a Mn=4,700.

An aqueous solution of this polymer was made by mixing 113.0 gms of polymer, 7.1 gms of 45% potassium hydroxide, and 389.0 gms of water. This made a 10% polymer solution.

Binder Additive 6:

The procedure for Binder Additive 4 was repeated with the following exceptions: 116.1 gms of trimethylsilyl methacrylate and 182.4 gms of 3-(trimethoxy)silylpropyl methacrylate were used in Feed II. This made a Z-6030/BZMA/MAA 5/10/5 (36/51/13 weight %) polymer at 36.7% solids with a Mn=3,400.

An aqueous solution of this polymer was made by mixing 136.0 gms of polymer, 10.1 gms of 45% potassium hydroxide, and 354.0 gms of water. This made a 10% polymer solution.

Binder Additive 7:

This shows the preparation using a free radical process of an alkoxysilane containing polymer, Z-6030/BZMA/DMAEMA 10/10/10.

A 3-liter flask is equipped with a mechanical stirrer, thermometer, N2 inlet, drying tube outlet, and addition funnels. Butyl acetate, 560 gms, and mesitylene, 5.0 gms, are charged to the flask. The solvent is heated to reflux. Feed I which is composed of azobisisobutyronitrile Vazo®-64, 30.5 gms, and butyl acetate, 270 gms is started and added over 330 minutes. Feed II is composed of 3-(trimethoxy) silylpropyl methacrylate [Z-6030 from Dow Corning], 371.0 gms, benzyl methacrylate, 265.5 gms, and dimethylaminoethyl methacrylate, 236.1 gms. It is started at 0.0 minutes and added over 300 minutes. Reflux is maintained throughout the reaction. Fifty minutes after Feed I is completed the reaction is stopped and 160.7 gms of dry methanol are added to the above solution and distillation began. This would make a Z-6030/BZMA/DMAEMA (43/30/27 weight %) polymer at 46.2% solids with a Mn of about 6,000.

An aqueous solution of this polymer is made by mixing 108.0 gms of polymer, 8.5 gms of phosphoric acid, and 383.0 gms of water. This would make a 10% polymer solution.

The polymeric dispersant was prepared using the following procedures:

Dispersant Polymer 1:

This shows the preparation of an anionic polymer which is a butylmethacrylate-b-methacrylic acid (10//10) diblock polymer.

A 12-liter flask is equipped with a mechanical stirrer, thermometer, N2 inlet, drying tube outlet, and addition funnels. Tetrahydrofuran THF, 3750 gms, and p-xylene, 7.4 gms, are charged to the flask. The catalyst tetrabutyl ammonium m-chlorobenzoate, 3.0 ml of a 1.0 M solution in acetonitrile, are then added. Initiator, 1,1-bis (trimethylsiloxy)-2-methyl propene, 291.1 gms (1.25 M) is injected. Feed I [tetrabutyl ammonium m-chlorobenzoate, 3.0 ml of a 1.0 M solution in acetonitrile] is started and added over 150 minutes. Feed II [trimethylsilyl methacrylate, 1976 gms (12.5 M)] is started at 0.0 minutes and added over 35 minutes. One hundred and eighty minutes after Feed II is completed (over 99% of the monomers had reacted) Feed III [butyl methacrylate, 1772 gms (12.5 M) is started and added over 30 minutes.

At 400 minutes, 780 gms of dry methanol are added to the above solution and distillation begins. During the first stage of distillation, 1300.0 gms of material are removed from the flask. Distillation continues during the second stage while the boiling point increases to 76° C. I-propanol, 5100 gms total, is added during the second stage of distillation. A total of 8007 gms of solvent are removed to obtain a butyl methacrylate//methacrylic acid block polymer of 2400 Mn and 52.1% solids.

Dispersant Polymer 2:

This shows the preparation of a cationic polymer which is a benzylmethacrylate-b-dimethylaminoethyl methacrylate 10//20 diblock polymer.

A 12-liter flask was equipped with a mechanical stirrer, thermometer, N2 inlet, drying tube outlet, and addition funnels. Tetrahydrofuran THF, 4002 gms, and p-xylene, 7.7 gms, were charged to the flask. The catalyst tetrabutyl ammonium m-chlorobenzoate, 2.0 ml of a 1.0 M solution in acetonitrile, was then added. Initiator, 1-methoxy-1-trimethylsiloxy-2-methyl propene, 155.1 gms (0.891 M) was injected. Feed I [2-dimethylaminoethyl methacrylate DMAEMA, 2801 gms (17.8 M)] was started at 0.0 minutes and added over 45 minutes. One hundred minutes after Feed I was completed (over 99% of the monomers had reacted) Feed II [benzyl methacrylate, 1568 gms (8.91 M) was started and added over 30 minutes.

At 400 minutes, 310 gms of dry methanol were added to the above solution and distillation begins. A total of 1725 gms of solvent were removed. I-propanol, 1783 gms, was added after completion of the distillation. This made a BZMA//DMAEMA 10//20 diblock polymer at 49.6% solids and a Mn=5000.

Pigment dispersions were made using the following procedures:

Magenta Pigment Dispersion 1:
The following ingredients were mixed:

| INGREDIENT | AMOUNT (GMS) |
|---|---|
| Dispersant Polymer 2 (49.2% solids) | 203.2 |
| Quinacridone magenta pigment (R-122 from Sun Chemical Corp., Cincinnati, OH) | 150.0 |
| I-propanol | 450.0 |

This mixture was then charged to a 2 roll mill and processed for 45 minutes. This made a pigment dispersion that contained 60% pigment and 40% polymer (P/D=1.5/1). This 2 roll mill chip was then dissolved using phosphoric acid as the neutralizing agent to make an aqueous pigment concentrate.

An aqueous pigment dispersion concentrate was prepared by mixing the following ingredients with adequate stirring:

| INGREDIENT | AMOUNT (GMS) |
|---|---|
| Magenta Pigment Dispersion 1 | 33.3 |
| Phosphoric acid (86.0%) | 5.47 |
| Deionized water | 161.23 |

This made an aqueous, pigment concentrate that contained 10% pigment and had 90 mole % of the amine groups from the polymer neutralized with phosphoric acid.

Magenta Pigment Dispersion 2:

This shows the preparation of an anionic magenta pigment dispersion using a BMA//MAA 10//10 diblock polymer and a 2 roll mill.

The following ingredients were mixed:

| INGREDIENT | AMOUNT (GMS) |
|---|---|
| Dispersant Polymer 1 (52.1% solids) | 191.9 |
| Quinacridone magenta pigment | 150.0 |
| Diethylene glycol | 50.0 |

This mixture was then charged to a 2 roll mill and processed for 45 minutes. This made a pigment dispersion that contained 50% pigment, 17% diethyleneglycol 33% polymer. It had a P/D=1.5/1. This 2 roll mill chip was then dissolved using potassium hydroxide as the neutralizing agent to make an aqueous pigment concentrate.

An aqueous pigment dispersion concentrate was prepared by mixing the following ingredients with adequate stirring:

| INGREDIENT | AMOUNT (GMS) |
|---|---|
| Magenta Pigment Dispersion 2 | 40.0 |
| Potassium hydroxide (45.0% solids) | 5.21 |
| Deionized water | 154.79 |

This made an aqueous, pigment concentrate that contained 10% pigment and had 90 mole % of the acid groups from the polymer neutralized with potassium hydroxide.

Control 1:

An ink was prepared by mixing the following ingredients with adequate stirring: 5.0 gms of Magenta Pigment Dispersion 1, 20.0 gms of water, and 10 microliters of 1.0 M tetrabutylammonium fluoride (TBAF).

Control 2:

An ink was prepared by mixing the following ingredients with adequate stirring: 5.0 gms of Magenta Pigment Dispersion 2, 20.0 gms of water, and 10 micoliters of 1.0 M tetrabutylammonium fluoride (TBAF).

EXAMPLES 1–12

Inks were prepared by mixing the following ingredients with adequate stirring:

| EXAMPLE # | INGREDIENT | AMOUNT (GMS) |
|---|---|---|
| 1 | Magenta Pigment dispersion 1 | 5.0 |
|   | Binder Additive 1 | 2.5 |
|   | Water | 17.5 |
|   | 1.0 M TBAF | 10 μl |
| 2 | Magenta Pigment dispersion 1 | 5.0 |
|   | Binder Additive 2 | 2.5 |
|   | Water | 17.5 |
|   | 1.0 M TBAF | 10 μl |
| 3 | Magenta Pigment dispersion 1 | 5.0 |
|   | Binder Additive 3 | 2.5 |
|   | Water | 17.5 |
|   | 1.0 M TBAF | 10 μl |
| 4 | Magenta Pigment dispersion 2 | 5.0 |
|   | Binder Additive 4 | 2.5 |
|   | Water | 17.5 |
|   | 1.0 M TBAF | 10 μl |
| 5 | Magenta Pigment dispersion 2 | 5.0 |
|   | Binder Additive 5 | 2.5 |
|   | Water | 17.5 |
|   | 1.0 M TBAF | 10 μl |
| 6 | Magenta Pigment dispersion 2 | 5.0 |
|   | Binder Additive 6 | 2.5 |
|   | Water | 17.5 |
|   | 1.0 M TBAF | 10 μl |
| 7 | Magenta Pigment dispersion 1 | 5.0 |
|   | Binder Additive 1 | 10.0 |
|   | Water | 10.0 |
|   | 1.0 M TBAF | 40 μl |
| 8 | Magenta Pigment dispersion 1 | 5.0 |
|   | Binder Additive 2 | 10.0 |
|   | Water | 10.0 |
|   | 1.0 M TBAF | 40 μl |
| 9 | Magenta Pigment dispersion 1 | 5.0 |
|   | Binder Additive 3 | 10.0 |
|   | Water | 10.0 |
|   | 1.0 M TBAF | 40 μl |
| 10 | Magenta Pigment dispersion 2 | 5.0 |
|   | Binder Additive 4 | 10.0 |
|   | Water | 10.0 |
|   | 1.0 M TBAF | 40 μl |
| 11 | Magenta Pigment dispersion 2 | 5.0 |
|   | Binder Additive 5 | 10.0 |
|   | Water | 10.0 |
|   | 1.0 M TBAF | 40 μl |
| 12 | Magenta Pigment dispersion 2 | 5.0 |
|   | Binder Additive 6 | 10.0 |
|   | Water | 10.0 |
|   | 1.0 M TBAF | 40 μl |

These inks contained 2.0% pigment and different types of alkoxysilane containing polymers. These inks were filled into a thermal ink jet pen and printed with a Hewlett Packard ink jet printer on Gilbert bond paper (25% cotton, Mead Co. Dayton, Ohio). They printed smoothly and were tested further.

Control 3:

An ink was made by combining the following ingredients with adequate stirring:

| INGREDIENT | AMOUNT (GMS) |
|---|---|
| Magenta Pigment Dispersion 1 | 20.00 |
| 2-ethyl-3-hydroxymethyl-1,3-propanediol | 10.00 |
| 2,2-dimethylpropanol | 2.00 |
| 1.0 M TBAF | 0.20 |
| Deionized water | 67.80 |

This made an ink that contained 2.0% pigment. The ink was filled into a thermal ink jet pen and printed with a Hewlett Packard ink jet printer on Gilbert bond paper (25% cotton, Mead Co., Dayton, Ohio). It printed smoothly and was tested further.

EXAMPLE 13

An ink was made by combining the following ingredients with adequate stirring:

| INGREDIENT | AMOUNT (GMS) |
|---|---|
| Magenta Pigment Dispersion 1 | 20.00 |
| Binder Additive Preparation 3 | 40.0 |
| 2-ethyl-3-hydroxymethyl-1,3-propanediol | 10.00 |
| 2,2-dimethylpropanol | 2.00 |
| 1.0 M TBAF | 0.20 |
| Deionized water | 27.80 |

This made an ink that contained 2.0% pigment and 4.0% of polymer Z-6030/BZMA/DMAEMA 5/10/5 (33/47/20 weight %). The ink was filled into a thermal ink jet pen and printed with a Hewlett Packard ink jet printer on Gilbert bond paper (25% cotton, Mead Co. Dayton, Ohio). It printed smoothly and was tested further.

EXAMPLE 14

An ink was made by combining the following ingredients with adequate stirring:

| INGREDIENT | AMOUNT (GMS) |
|---|---|
| Magenta Pigment Dispersion 1 | 20.00 |
| Binder Additive 2 | 40.0 |
| 2-ethyl-3-hydroxymethyl-1,3-propanediol | 10.00 |
| 2,2-dimethylpropanol | 2.00 |
| 1.0 M TBAF | 0.20 |
| Deionized water | 27.80 |

This made an ink that contained 2.0% pigment and 4.0% of polymer Z-6030/BZMA/DMAEMA 10/10/5 (50/35/15 weight %). The ink was filled into a thermal ink jet pen and printed with a Hewlett Packard ink jet printer on Gilbert bond paper (25% cotton, Mead Co. Dayton, Ohio). It printed smoothly and was tested further.

EXAMPLE 15

An ink was made by combining the following ingredients with adequate stirring:

| INGREDIENT | AMOUNT (GMS) |
|---|---|
| Magenta Pigment Dispersion 1 | 20.00 |
| Binder Additive Preparation 1 | 40.0 |
| 2-ethyl-3-hydroxymethyl-1,3-propanediol | 10.00 |
| 2,2-dimethylpropanol | 2.00 |
| 1.0 M TBAF | 0.20 |
| Deionized water | 27.80 |

This made an ink that contained 2.0% pigment and 4.0% of polymer Z-6030/BZMA/DMAEMA 10/10/10 (43/30/27 weight %). The ink was filled into a thermal ink jet pen and printed with a Hewlett Packard ink jet printer on Gilbert bond paper (25% cotton, Mead Co. Dayton, Ohio). It printed smoothly and was tested further.

TESTING

The control and example inks were tested for resistance to smearing or running from either water or highlighters.

In this first set of tests these inks were printed and then evaluated for resistance to water and highlighter smear after 1 hr and 24 hours. Some samples after printing were heated to 60° C. Resistance to water, called drip, was determined by pouring water across a printed line or page and then observing the amount of ink that ran down the page. Resistance to highlighters, called smear, was determined by rubbing either an acidic or a basic highlighter across a printed line or page and then observing the amount of ink that is smeared by the highlighter. The printed samples were rated on a scale of 0 to 5 with 0 being best. A "0" rating indicates no dripping or smearing from the water or highlighter. A rating above 2 is not commercially acceptable.

| | RESISTANCE RATINGS | | | | | |
|---|---|---|---|---|---|---|
| | WATER | | ACIDIC TYPE | | BASIC TYPE | |
| SAMPLE # | 1 HR. | 24 HR. | 1 HR. | 24 HR. | 1 HR. | 24 HR. |
| ROOM TEMPERATURE RESULTS: | | | | | | |
| CONTROL 1 | 4 | 4 | 5 | 5 | 5 | 5 |
| EXAMPLE 1 | 4 | 4 | 5 | 5 | 1 | 1 |
| EXAMPLE 2 | 4 | 2 | 5 | 5 | 1 | 1 |
| EXAMPLE 3 | 4 | 2 | 4 | 3 | 1 | 1 |
| EXAMPLE 7 | 4 | 1 | 2 | 2 | 0 | 0 |
| EXAMPLE 8 | 1 | 0 | 1 | 1 | 0 | 0 |
| EXAMPLE 9 | 3 | 0 | 0 | 0 | 0 | 0 |
| HEATED RESULTS: | | | | | | |
| CONTROL 1 | 4 | | 5 | | 5 | |
| EXAMPLE 7 | 4 | | 3 | | 1 | |
| EXAMPLE 8 | 0 | | 0 | | 0 | |
| EXAMPLE 9 | 3 | | 2 | | 0 | |
| ROOM TEMPERATURE RESULTS: | | | | | | |
| CONTROL 2 | 4 | 1 | 1 | 1 | 5 | 5 |
| EXAMPLE 4 | 4 | 0 | 0 | 0 | 5 | 5 |
| EXAMPLE 5 | 1 | 0 | 0 | 0 | 5 | 3 |
| EXAMPLE 6 | 1 | 0 | 0 | 0 | 5 | 3 |
| EXAMPLE 10 | 4 | 0 | 0 | 0 | 5 | 5 |
| EXAMPLE 11 | 0 | 0 | 0 | 0 | 2 | 1 |
| EXAMPLE 12 | 1 | 0 | 0 | 0 | 2 | 2 |
| HEATED RESULTS: | | | | | | |
| CONTROL 2 | 3 | | 1 | | 5 | |
| EXAMPLE 10 | 1 | | 0 | | 4 | |
| EXAMPLE 11 | 0 | | 0 | | 5 | |
| EXAMPLE 12 | 0 | | 0 | | 4 | |

In this second set of tests these inks were printed and then evaluated for resistance to water washoff after 0, 1, 4 and 24 hours. Some samples were printing on a printer that does not have a heater. Others were printed on a printer that has a heater. Resistance to water washoff was determined by pouring water across a printed line or page and then measuring the amount of ink, reported as optical density units (O.D.), that runs down the page. Lower values of Optical Density drip are desired.

| | RESISTANCE RATINGS | | | | |
|---|---|---|---|---|---|
| | PRINTER | INITIAL | O.D. OF WATER RUNOFF | | |
| SAMPLE # | HEATER | O.D. | 1 HR. | 4 HR. | 24 HR. |
| CONTROL 3 | OFF | 0.78 | 0.23 | 0.20 | 0.21 |
| EXAMPLE 13 | OFF | 0.67 | 0.29 | 0.05 | 0.01 |
| EXAMPLE 14 | OFF | 0.78 | 0.04 | 0.01 | 0.00 |
| EXAMPLE 15 | OFF | 0.78 | 0.25 | 0.05 | 0.01 |
| CONTROL 3 | ON | 0.71 | 0.20 | 0.21 | 0.20 |
| EXAMPLE 13 | ON | 0.52 | 0.18 | 0.01 | 0.00 |
| EXAMPLE 14 | ON | 0.63 | 0.09 | 0.00 | 0.00 |
| EXAMPLE 15 | ON | 0.56 | 0.25 | 0.01 | 0.00 |

These results show the improvement in water drip and highlighter smear resistance that is obtained in a thermal ink jet ink with the addition of a an alkoxysilane containing polymer as a binder additive.

What is claimed is:

1. An aqueous ink jet ink composition comprising:
   (A) an aqueous vehicle;
   (B) a pigment;
   (C) an alkoxysilane binder additive and;
   (D) a block copolymer pigment dispersant
   wherein said ink composition comprises approximately 0.1 to 8% pigment, 0.1 to 10% block copolymer, 57 to 99.3% aqueous vehicle and 0.5 to 25% of the alkoxysilane binder additive, based upon the total weight of the ink composition.

2. The ink composition of claim 1, wherein the alkoxysilane binder additive has a number average molecular weight of 4,000 to 10,000.

3. The ink composition of claim 1, wherein the alkoxysilane binder additive is prepared from an alkoxysilane having the following structure:

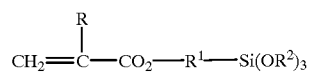

where R=H, methyl or ethyl; $R^1$=alkyl, aryl, or alkyaryl, preferably an aliphatic group containing 3 carbons; and $R^2$=alkyl, aryl or alkylaryl, preferably an aliphatic group containing up to 5 carbons.

4. The ink composition of claim 1, wherein the binder additive is 3-(trimethoxy)silylpropyl methacrylate-co-benzyl methacrylate-co-methacrylic acid with a number average molecular weight of 5,100.

5. The ink composition of claim 1, wherein the binder additive is is 3-(trimethoxy)silylpropyl methacrylate-co-benzyl methacrylate-co-dimethylaminoethyl methacrylate with a number average molecular weight of 5,800.

6. The ink composition of claim 1, wherein said binder additive is present in the amount of 0.5 to 5% by weight, based on the total weight of the ink composition.

7. An aqueous ink jet ink composition comprising:

(A) an aqueous vehicle;

(B) a dye; and (C) an alkoxysilane binder additive;

wherein said ink composition comprises approximately 0.2 to 20% dye, and 55 to 99.3% aqueous vehicle and 0.5 to 25% of the alkoxysilane binder additive, based on the total weight of the ink composition and wherein the alkoxysilane binder additive is prepared from an alkoxysilane having the following structure:

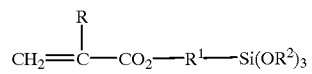

where R=H, methyl or ethyl; $R^1$=alkyl, aryl, or alkyaryl; and $R^2$=alkyl, aryl or alkylaryl.

8. The ink composition of claim 7, wherein the alkoxysilane binder additive has a number average molecular weight of 4,000 to 10,000.

9. The ink composition of claim 7, wherein the binder additive is 3-(trimethoxy)silylpropyl methacrylate-co-benzyl methacrylate-co-methacrylic acid with a number average molecular weight of 5,100.

10. The ink composition of claim 7, wherein the binder additive is is 3-(trimethoxy)silylpropyl methacrylate-co-benzyl methacrylate-co-dimethylaminoethyl methacrylate with a number average molecular weight of 5,800.

11. The ink composition of claim 7, wherein said binder additive is present in the amount of 0.5 to 5% by weight, based on the total weight of the ink composition.

* * * * *

UNITED STATES PATENT AND TRADEMARK OFFICE
CERTIFICATE OF CORRECTION

PATENT NO. : 6,180,690 B1
DATED : January 30, 2001
INVENTOR(S) : Spinelli

It is certified that error appears in the above-identified patent and that said Letters Patent is hereby corrected as shown below:

<u>Title page,</u>
Item (75) Inventor: Joseph Harry Spinelli, Wilmington, DE (US) should be
-- Harry Joseph Spinelli, Wilmington, DE (US) --

Signed and Sealed this

Twenty-fifth Day of September, 2001

Attest:

*Nicholas P. Godici*

NICHOLAS P. GODICI
*Attesting Officer*  *Acting Director of the United States Patent and Trademark Office*